US012794892B2

(12) United States Patent
Wang et al.

(10) Patent No.: US 12,794,892 B2
(45) Date of Patent: Nov. 10, 2026

(54) APPLICATION GATEWAY INTEGRATION WITH ENTITLEMENT AND AUDITING SERVICES

(71) Applicant: Capital One Services, LLC, McLean, VA (US)

(72) Inventors: Jinlian Wang, Falls Church, VA (US); Peter Zeller, Groveland, FL (US); Matthew Griffin, Richmond, VA (US); Kevin Bumgarner, Chesterfield, VA (US); Dennis Hall, Chesterfield, VA (US); Alexander Kent, Chaska, MN (US)

(73) Assignee: Capital One Services, LLC, McLean, VA (US)

( * ) Notice: Subject to any disclaimer, the term of this patent is extended or adjusted under 35 U.S.C. 154(b) by 73 days.

(21) Appl. No.: 19/006,546

(22) Filed: Dec. 31, 2024

(65) Prior Publication Data

US 2026/0189559 A1 Jul. 2, 2026

(51) Int. Cl.

*G06F 21/00* (2013.01)
*H04L 9/40* (2022.01)
*H04L 67/02* (2022.01)

(52) U.S. Cl.

CPC .............. *H04L 63/10* (2013.01); *H04L 63/08* (2013.01); *H04L 67/02* (2013.01)

(58) Field of Classification Search

None

See application file for complete search history.

(56) References Cited

U.S. PATENT DOCUMENTS 8,990,900 B2 * 3/2015 Edwards ............... H04L 63/104 726/4
9,092,640 B2 7/2015 Domany et al.
10,581,798 B2 * 3/2020 Meuninck ........... H04L 61/4511
11,012,233 B1 * 5/2021 Uhr ......................... H04L 9/321
11,108,827 B2 8/2021 Beckman et al.
11,210,661 B2 * 12/2021 Hong ............... G06Q 20/38215
11,750,603 B2 * 9/2023 Holz .................. G06Q 30/0277 705/14.49
11,792,203 B2 * 10/2023 Pitchaimani ........ H04L 63/0807 726/4

(Continued)

*Primary Examiner* — Maung T Lwin

(74) *Attorney, Agent, or Firm* — Banner & Witcoff, Ltd.

(57) ABSTRACT

The present disclosure describes application gateways that integrate with information technology governance tools via one or more application programming interfaces. A user may request access to a first application. The application gateway may confirm, via the information technology governance tools, whether the user is authorized to access the first application. When the user is authorized to access the first application, the application gateway may forward the request to the first application. The application gateway may receive responses from the first application and analyze the responses to verify that the responses comply with the one or more governance policies. When the responses comply, the application gateway may send the responses to the user device. Accordingly, traffic between the user device and the first application may be routed through the application gateway to monitor the communications and verify that the communications, and the information contained therein, are authorized.

20 Claims, 4 Drawing Sheets

(56) References Cited

U.S. PATENT DOCUMENTS

| | | | | |
|---|---|---|---|---|
| 12,003,543 | B1 | 6/2024 | Ali et al. | |
| 2010/0306547 | A1 * | 12/2010 | Fallows | H04L 63/0815 713/178 |
| 2017/0310666 | A1 * | 10/2017 | Six | H04L 63/08 |
| 2021/0281548 | A1 | 9/2021 | Ackerly et al. | |
| 2022/0417241 | A1 * | 12/2022 | Zilbershtein | H04L 9/3247 |
| 2023/0033907 | A1 * | 2/2023 | Akhter | H04L 9/3213 |
| 2023/0131132 | A1 | 4/2023 | Dion et al. | |
| 2024/0048381 | A1 * | 2/2024 | Sekhar Rao | G06F 21/31 |
| 2024/0232543 | A1 | 7/2024 | Horger et al. | |

* cited by examiner

APPLICATION GATEWAY INTEGRATION WITH ENTITLEMENT AND AUDITING SERVICES

FIELD OF THE INVENTION

The present disclosure generally relates to application gateways and, specifically, application gateways integrating with existing entitlement and auditing services.

BACKGROUND OF THE INVENTION

Often, enterprise web applications are not easily modifiable to accommodate ever-evolving security requirements. In some instances, the enterprise web applications may be hosted by third parties that do not allow for modifications. Additionally or alternatively, the enterprise web applications may be based on outdated code (e.g., COBOL) and, therefore, be incapable of being updated to comply with modern security requirements. Accordingly, there is a need for a solution to ensure that authentication, authorization, and accounting to these web-based applications comply with security requirements.

SUMMARY OF THE INVENTION

The following presents a simplified summary of various features described herein. This summary is not an extensive overview, and is not intended to identify key or critical elements or to delineate the scope of the claims. The following summary merely presents some concepts in a simplified form as an introductory prelude to the more detailed descriptions provided below. Corresponding apparatus, systems, and computer-readable media are also within the scope of the disclosure.

Aspects of the disclosure generally relate to application gateways (e.g., access gateways) that integrate with information technology governance tools via one or more application programming interfaces (API(s)). The application gateway described herein may control access to one or more applications through a variety of techniques. For example, users may request access to one or more applications by registering with the application gateway. Upon registering with the application gateway, a user may be provisioned a role that includes at least two entitlements: authentication credentials configured to provide access to the application gateway and access credentials configured to provide access to the one or more applications. After a role has been provisioned, the user may login to the application gateway using the authentication credentials, after which the user may then request access to a first application. The application gateway may confirm, via the information technology governance tools, that the user has authorization to access first application. When the user is not authorized, the request may be denied. However, when the user is authorized to access the first application, the application gateway may forward the request to the first application. In some instances, a user's first request to the first application may comprise the access credentials. The application gateway may receive responses from the first application. The application gateway may analyze the responses from the first application to ensure that the responses comply with the one or more governance policies. If the responses do not comply with the one or more governance policies, the application gateway may remove information from the response that the user is not entitled to receive. In some instances, the application gateway may block a response entirely. However, when the responses comply with the one or more governance policies, the application gateway may forward (e.g., send) the responses to the user device. In this regard, traffic between the user device and the first application may be routed through the application gateway to ensure compliance with the one or more governance policies.

According to additional aspects of the disclosure, the application gateway described herein may also monitor and log requests between user devices and the one or more applications. In this regard, the application gateway may audit the interactions between user devices and the one or more applications, for example, as part of a security audit, which may be performed annually. The application gateway may track and record requests for any given user. Each record may include an indication of who is performing the action, what the action is, which resource it is being performed on, and the response status (e.g., allowed or denied). The data collected by the application gateway may ensure that proper access control is being enforced. The application gateway may also include one or more user interfaces to identify non-compliant applications, role violations, etc. In this regard, the application gateway may be configured to generate reports as part of an annual security audit, which may assist in identifying and resolving potential segregation of duties (SOD) violations.

These features, along with many others, are discussed in greater detail below.

BRIEF DESCRIPTION OF DRAWINGS

The present disclosure is described by way of example and not limited in the accompanying figures in which like reference numerals indicate similar elements and in which.

DETAILED DESCRIPTION OF THE INVENTION

Figure 1:
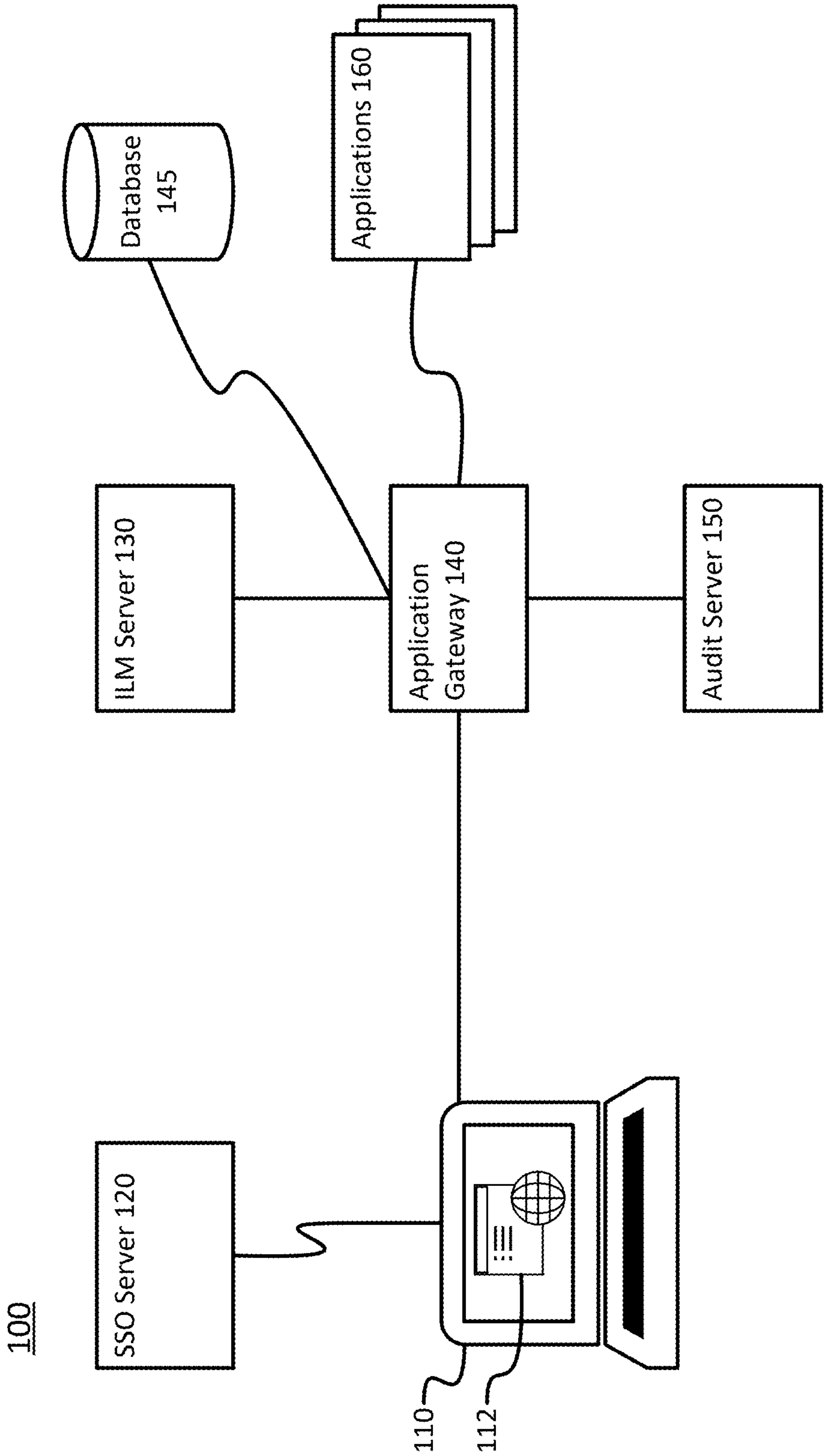
FIG. 1 shows an example of a system in which one or more features described herein may be implemented.

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning consistent with the disclosures and/or descriptions below.

By way of introduction, features discussed herein may relate to application gateways (e.g., access gateways) that integrate with information technology governance tools, such as access management tools, identity lifecycle management (ILM) tools, identity governance and administration (IGA) tools, privileged access management (PAM)

tools, active directory management (ADM) tools, and the like. The application gateway described herein may communicate with one or more information technology governance tools via one or more application programming interfaces (API(s)). The application gateway described herein may control access to one or more applications through a variety of techniques. The application gateway described herein improves over prior solutions by integrating with existing information technology governance tools to ensure that users adhere to corporate governance polices associated with accessing computing devices. Accordingly, the application gateway described herein improves the authentication, authorization, and accounting of user access.

Users may request access to one or more applications by registering with the application gateway. In this regard, the one or more applications may comprise one or more web-based applications, and a user may request a role for a first application of the one or more applications. The user may request the role from the information technology governance tools. In some examples, the request may be made via a secure enterprise browser, such as those provided by Island, Palo Alto Networks, CyberArk, and LayerX. If approval for the role is granted, the application gateway may create an account for the user that includes two entitlements: authentication credentials that provide access to the application gateway and access credentials for accessing the one or more applications. The account and/or both entitlements may be stored in a database, such as a secure vault configured to manage identity-based secrets. By provisioning an account for the user in the database, the access credentials may be securely stored and retrieved by the application gateway, for example, when the user attempts to authenticate with the first application.

After a role has been provisioned, the user may then request access to the first application. Requesting access to the first application may begin with the user authenticating to the application gateway. In some instances, the user may authenticate to the application gateway using their authentication credentials (e.g., enterprise credentials, single sign-on credentials, etc.). As used herein, authentication credentials may comprise a combination of authentication factors (e.g., a username and password) that are used to verify an individual or device requesting access to a restricted space, such as a corporate network. Authentication credentials are unique to an individual (i.e., authentication credentials are not shared amongst individuals). Authentication should occur before any activity is permitted through the application gateway to the application. Based on the authentication credentials, the application gateway may retrieve the access credentials from the database. As used herein, access credentials may comprise a combination of authentication factors (e.g., a username and password) that are used to verify an individual or device's request to access an application or a service (e.g., applications 160). In this regard, the access credentials may be shared by one or more users, for example, based on shared entitlements and/or roles. The application gateway may use the access credentials to access the one or more applications, for example, by detecting a login page and automatically filling-in the access credentials on the login page to access the one or more applications. Upon successfully authenticating to the application gateway, the user may initiate requests to one or more applications. In some instances, these requests may be redirected through the application gateway. The redirected requests may be realized by pre-configuring the browser proxy settings to use the application gateway as a proxy server. According to some examples, a browser cookie may also be used to ensure that user information accompanies all requests and/or traffic originating from the user device. By redirecting the requests via the application gateway and by attaching user information to traffic, the application gateway may verify whether a user is entitled to access the first application. That is, the application gateway may verify a user's identity and enforce access controls according to the role and/or entitlement of the user. Approved requests may be forwarded directly from the application gateway to the first application. Denied requests, on the other hand, may cause the application gateway to send an "unauthorized" response back to the user, without forwarding the request to the first application.

In some instances, the one or more applications may be configured to block direct access from any other channels, ensuring that all traffic passes through the application gateway. In other words, if the gateway denies a user's request, there is no alternative way for the user to bypass the restriction. This restriction ensures that the application gateway manages access control on behalf of the one or more applications. Blocking access via other means may be realized via multiple approaches, including, for example, security groups, utility tools, and/or commercial firewall products.

As an additional security measure, the application gateway described herein may also monitor requests, for example, as part of an annual security audit. In this regard, federated controls may mandate that application teams across an enterprise conduct an annual security audit, which involves reviewing the permissions within a native application, which are grouped into profiles. These profiles may be reviewed and validated to ensure that the profiles are properly configured. The review may also ensure that access is being enforced appropriately. Security audits are also designed to identify and resolve potential segregation of duties (SOD) violations.

The application gateway described herein may automate the security audit process. As noted above, the application gateway may act as a proxy between the user's browser and the one or more applications. In this regard, the application gateway may track and record requests for any given user. Each record may include an indication of who is performing the action, what the action is, which resource it is being performed on, and the response status (e.g., allowed or denied). The data collected by the application gateway may ensure that proper access control is being enforced, for example, according to a "request-to-roles matrix." The application gateway may also include one or more user interfaces to identify non-compliant applications, role violations, etc. Accordingly, the application gateway may accurately record each users' interaction with each of the one or more applications to ensure that the interactions comply with corporate governance policies, as well as state and federal regulations.

FIG. 1 shows an example of a system 100 that includes a user device 110, a single sign-on (SSO) server 120, an identity lifecycle management (ILM) server 130—connected to database 145, an audit server 150, and an application gateway 140 configured to control access to one or more applications 160, interconnected via a network (not shown).

User device 110 may be a mobile device, such as a cellular phone, a mobile phone, a smart phone, a tablet, a laptop, a virtual desktop, or an equivalent thereof. First user device 110 may be associated with a first user. First user device 110 may provide a first user with access to various applications and/or services, including one or more applications and/or services that allow the first user to access the Internet.

Additionally, first user device 110 may provide the first user with one or more applications located thereon, including an application 112. The one or more applications may provide the first user with a plurality of tools and access to a variety of services. While only a single user device is shown in FIG. 1, it will be appreciated that a plurality of user devices may be incorporated in the system shown in FIG. 1.

Application 112 may be configured to access one or more applications and/or data. In this regard, application 112 may comprise a secure, enterprise web browser, such as Island, Prisma Access by Palo Alto Networks, CyberArk, and LayerX. In this regard, application 112 may be configured to provide secure access to applications and corporate resources online. Additionally, application 112, may allow remote workers or third parties to access organizational resources regardless of the device. Furthermore, application 112 may allow administrators to monitor end-user activities and prevent potential breaches, while enforcing policy-based granular access controls.

SSO server 120 may be any server capable of authenticating user credentials. In this regard, SSO server 120 may be configured to provide federated authentication, which allows a single set of login credentials to access multiple applications. SSO server 120 may be configured to confirm (e.g., authenticate, verify) that a user's login credentials match their identity in a database. For example, a user may visit a site or app that they would like to access. The site or app may receive login credentials, send them to SSO server 120, which compares the received credentials to stored credentials. If the authentication/verification process is successful, SSO server 120 may provide an indication that the authentication/verification was successful to the site or app, after which, the user may access the site or app. SSO server 120 may be a stand-alone server, a corporate server, or a server located in a server farm or cloud-computer environment. According to some examples, SSO server 120 may be a virtual server hosted on hardware capable of supporting a plurality of virtual servers. Additionally, SSO server 120 may be communicatively coupled to database (not shown) configured to store information on behalf of SSO server 120. The information may include user account information, authentication credentials, etc.

ILM server 130 may be any server capable of managing user identities via Identity Governance and Administration (IGA). IGA combines Identity Governance and Identity Administration to reduce the risk of identity-based attacks. ILM server 130 may be configured to provide administrative tools that allow for onboarding and offboarding users and managing their access rights and/or privileges. In particular, ILM server 130 may be configured to provision enterprise identities and associated credentials, assign access permissions and entitlements, and continually manage identities, credentials, permissions and entitlements. In addition to provisioning identities and credentials, ILM server 130 may be further configured to perform attestation and certification, as well as auditing, analytics, and reporting. Like SSO server 120 above, ILM server 130 may be a stand-alone server, a corporate server, or a server located in a server farm or cloud-computer environment. Additionally or alternatively, ILM server 130 may be a virtual server hosted on hardware capable of supporting a plurality of virtual servers. ILM server 130 may also be communicatively coupled to database 145. Although shown separately in FIG. 1, it will be appreciated that SSO server 120 and ILM server 130 may be co-located on the same computing device. It will be further appreciated that the functionality described above with respect to SSO server 120 and ILM server 130 may be performed by the same device.

In operation, users apply for an application role for a web application through ILM server 130. The role would include two entitlements, one for application gateway 140 and another for access to credentials stored in database 145. Once this access request is approved, a corresponding account for this user and its corresponding entitlements are provisioned in application gateway 140. Accordingly, application gateway 140 would have a record that the user is approved to access application gateway 140. Additionally, a corresponding account for this user and its corresponding entitlement may also be provisioned in database 145. In this regard, database 145 would have a record indicating that the user is allowed to retrieve the access credentials, which will be carried out by application gateway 150 on their behalf to authenticate with the legacy web application when access one or more applications 160.

Application gateway 140 may be configured to authenticate and/or control access to one or more applications 160. Additionally, application gateway 140 may be configured to create, update, and/or delete user accounts. Application gateway 140 may also be capable of configuring one or more entitlements, privileges, and/or rights for users. Application gateway 140 may comprise one or more APIs to interface with SSO server 120, ILM server 130, database 145, or any combination thereof to create, update, and/or delete user accounts, as well as configure one or more entitlements, privileges, and/or rights for users. Application gateway 140 may communicate with SSO server 120, ILM server 130, database 145, or any combination thereof, via the one or more APIs, to realize the functionality described herein. Application gateway 140 may also provide firewall functionality. That is, application gateway 140 may act as a web application firewall (WAF) that filters, monitors, and/or blocks traffic to and from a web service, such as one or more applications 160. Application gateway 140 may be implemented via software, such as a container. Additionally or alternatively, application gateway 140 may be implemented using any suitable server, including a stand-alone server, a corporate server, a server located in a server farm or cloud-computer environment, or a virtual server hosted on hardware capable of supporting a plurality of virtual servers.

In operation, users may authenticate with application gateway 140 using SSO server 120. Authentication typically occurs before any web activity is permitted through application gateway 140 to the one or more applications 160. The authentication, in combination with a browser cookie, ensures that user information accompanies all web traffic for identity verification that is required by the application gateway 140 to enforce proper access control according to the provisioned entitlement. In this regard, users may initiate web requests to the one or more application 160. The requests may be redirected to application gateway 140, for example, by pre-configuring the browser's proxy settings to use application gateway 140 as its proxy server, for example, if the application gateway 140 is deployed and maintained centrally by identity access management. Alternatively, if application gateway 140 is deployed alongside the one or more applications 160, application gateway 140 may serve as the local reverse proxy server, fronting the one or more applications 160. For users with the appropriate entitlements, application gateway 140 may check out access credentials from database 145 automatically on the users' behalf and auto-fills the access credentials when application gateway 140 detects a login page associated with an application of the one or more applications 140. For all requests initiated by any users that have authorization, the requests forwarded to the one or more applications 160 and the response is passed back to users and the browser 112. For users that do not authorization, application gateway 140 may send an "unauthorized" response back to the users and the web browser 112, without forwarding the request to the one or more application 160.

Audit server 150 may be any suitable server configured to monitor and/or log system records and/or activities. In particular, audit server 150 may be configured to monitor and/or log, amongst other things, login attempts and access requests with respect to a user's entitlements, privileges, and/or roles. In some instances, audit server 150 may be configured to generate reports associated with respect to the records and activities being monitored and/or logged. The reports may be based on a comparison of the records and activities to one or more corporate governance policies. Audit server 150 may be a stand-alone server, a corporate server, or a server located in a server farm or cloud-computer environment. According to some examples, audit server 150 may be a virtual server hosted on hardware capable of supporting a plurality of virtual servers. Although shown separately in FIG. 1, it will be appreciated that audit server 150 and application gateway 140 may be co-located on the same computing device. It will be further appreciated that the functionality of audit server 150 and application gateway 140 may be performed by the same device.

As discussed in greater detail herein, application gateway 140 may receive authentication credentials from user device 110. Application gateway 140 may be configured to integrate with an identity provider (e.g., SSO server 120) and integrate with an identity management tool (e.g., ILM server 130) to store user accounts and/or their approved entitlements, privileges, and/or roles. Application gateway 140 may coordinate with SSO server 120, ILM server 130, database 145, or any combination thereof to verify the authentication credentials. Application gateway 140 may provide one or more user interfaces to configure the integration of application gateway 140 with the one or more applications 160. Additionally or alternatively, application gateway 140 may provide one or more user interfaces configured to generate and store multiple credentials, with each credentials being associated with an entitlement to access an application of the one or more applications 160. Application gateway 140 may also be configured to detect login pages, generate and fill-in password placeholders, and replace the password placeholders with valid access credentials, for example, when a user submits a login request. Upon successful verification of authentication credentials, application gateway 140 may retrieve access credentials from database 145. In this regard, database 145 may be configured to store information on behalf of application gateway 140. The information may include, but is not limited to, user account information, authentication credentials, access credentials, user entitlements, user privileges, user roles, user rights, policies (e.g., corporate governance policies), etc. Database 145 may store one or more access credentials (e.g., username and password) for accessing the one or more applications 160. Each access credential, of the one or more access credentials may be associated with an entitlement, privileged, and/or role. According to some examples, database 145 may record (e.g., log) each time an access credential is used by a user to access one or more applications 160. That is, database 145 may record each time an access credential is checked-out by a user. Database 145 may monitor and/or record each time an access credential is checked out for audit and/or compliance purposes. Additionally, access credentials may never be exposed to end-users. In other words, the access credentials may be maintained in confidence by application gateway 140 after being checked-out. Database 145 may include, but is not limited to relational databases, hierarchical databases, distributed databases, in-memory databases, flat file databases, XML databases, NoSQL databases, graph databases, and/or a combination thereof.

After verification of the authentication credentials, a user may initiate requests to one or more applications 160. As noted above, the requests may be redirected through application gateway 140. Application gateway 140 may verify whether a user is entitled to access a requested application. In other words, application gateway 140 may verify a user's identity and enforce access controls according to the entitlement, privilege, and/or role of the user. If the user is authorized to access the application, application gateway 140 may send (e.g., transmit) access credentials to the requested application. In this regard, application gateway 140 may automatically fill-in the access credentials in a login of the requested application. To prevent users from obtaining the access credentials, application gateway 140 may cause a fake password to be displayed on the user's browser. The fake password may be provided via a response to the user's browser. In this way, the user may not be able to retrieve the password, for example, if the user were to inspect the webpage using one or more inspection tools (e.g., DOM tree). The requested application may verify the received access credentials, and, when verified, provide access to the requested application. Similarly, subsequent requests to access the requested application may be reviewed by application gateway 140 to ensure that the subsequent requests comply with the user's entitlements, privileges, and/or roles. Approved requests may be forwarded directly from application gateway 140 to the requested application, while denied requests may cause application gateway 140 to send a rejection response to the user device 110, without forwarding the request to the first application. Application gateway 140 may also be configured to analyze responses from one or more application 160 to ensure that the responses comply with the one or more policies. When the responses do not comply, application gateway 140 may redact information from the response that the user is not entitled to receive. In some instances, application gateway 140 may block a response entirely. Conversely, when the responses comply with the one or more policies, application gateway 140 may send (e.g., transmit) the responses to user device 110. Application gateway 140 may be configured to monitor traffic between user device 110 and one or more applications 160 to ensure compliance with one or more policies.

One or more applications 160 may be any application that executed (e.g., runs) on a remote server and is accessible via a web browser executing on user device 110. One or more applications 160 may be corporate (e.g., enterprise) applications. The corporate applications may comprise one or more productivity tools, such as word processing applications, presentation applications, communication applications, etc. According to some examples, the one or more applications 160 may comprise legacy applications. Each application, of the one or more applications 160, may be pre-configured with a plurality of user accounts. Each user account may correspond to an associated entitlement, privilege, and/or role. As noted above, the credentials associated with the user accounts may be stored in a database, such as database 145. One or more applications 160 may be located on the same network as user device 110, SSO server 120, ILM server 130, application gateway 140, and/or audit server 150. Alternatively, one or more applications 160, or a subset of the one or more applications 160, may be located on a different network than user device 110, SSO server 120, ILM server 130, application gateway 140, and/or audit server 150. The different network may be an external network. In some instances, one or more applications 160 may be hosted on the Internet. Application gateway 140 may be part of an internal, corporate network and configured to control access to one or more external applications. Alternatively, application gateway 140 may be deployed alongside one or more applications. According to these examples, application gateway 140 may server as a local reverse proxy server, fronting each application of the one or more applications that the application gateway was deployed alongside.

User device 110, SSO server 120, ILM server 130, audit server 150, application gateway 140, and the one or more applications 160 may be interconnected using any suitable network, including the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
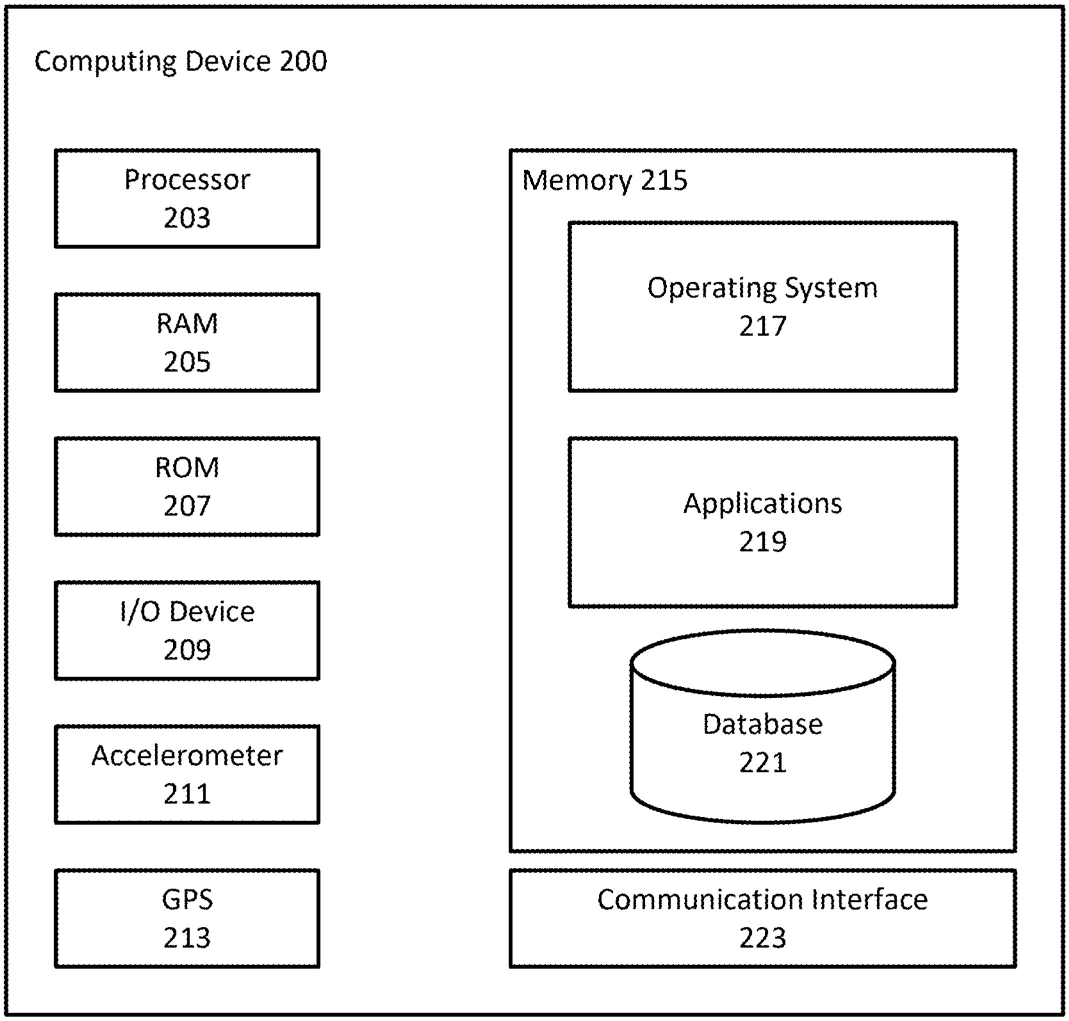
FIG. 2 shows an example of a computing device in accordance with one or more aspects of the disclosure.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3:
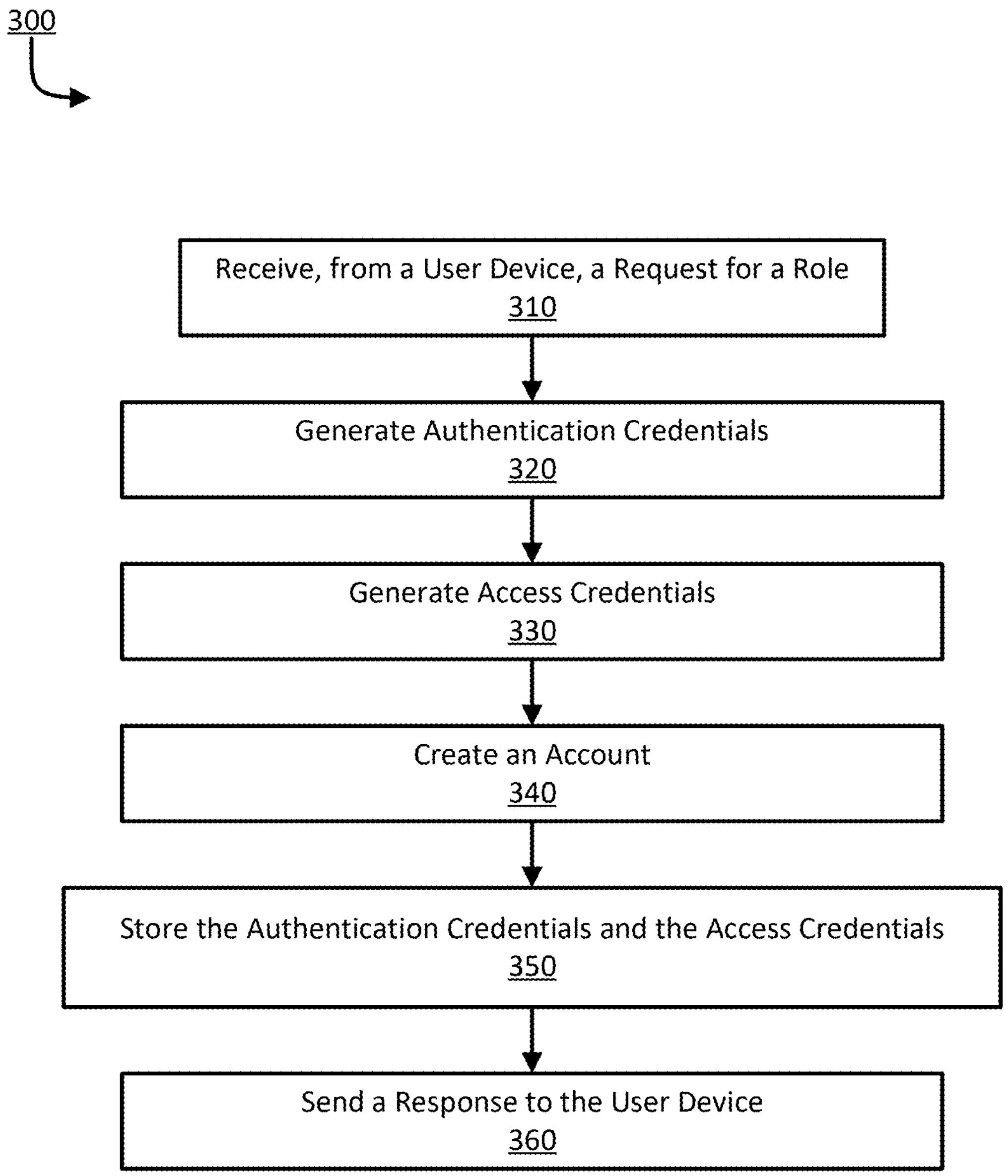
FIG. 3 shows an example of a process for registering with an application gateway in accordance with one or more aspects of the disclosure.

FIG. 3 shows an example of a process for enrolling with an application gateway in accordance with one or more aspects of the disclosure. Some or all of the steps of the process shown in FIG. 3 may be performed using one or more computing devices as described herein, including, for example, user device 110, SSO server 120, ILM server 130, audit server 150, application gateway 140, one or more applications 160, or any combination thereof.

In step 310, a computing device (e.g., ILM server 130, application gateway 140) may receive an enrollment request from a user device (e.g., user device 110). In other words, the computing device may receive a request to register a new user account. Alternatively, the computing device may receive a request for a role for a web application. The request may be reviewed. Once approved, new entitlements may be created for the user. The new entitlements may include authentication credentials and access credentials.

In step 320, the computing device may generate authentication credentials. The authentication credentials may be used to authenticate the user to various devices, including, for example, the application gateway described herein. Generating the authentication credentials may include allowing a user to select a username and/or password. Additionally or alternatively, generating the authentication credentials may include configuring biometric authentication or multi-factor authentication. In some instances, generating the authentication credentials may include obtaining a user's existing enterprise credentials, which may be used as single sign-on credentials to access a plurality of devices and/or services.

In step 330, the computing device may generate access credentials. The access credentials may be used to access one or more applications, such as the one or more applications 160 discussed above. In some instances, the access credentials may be shared by a plurality of user devices. In this regard, the access credentials may be retrieved from a database (e.g., database 145) and associated with new user account being created. Alternatively, the access credentials may be generated for the new user account as part of the enrollment process.

After the entitlements are generated, the computing device may create an account for the user device, in step 340. Creating an account may include creating an entry in a database (e.g., database 145). The entry may include a username, the authentication credentials, the access credentials, an indication of the user's role, an indication of the user's rights and/or privileges, and the like. That is, the computing device may store the authentication credentials and the access credentials in the entry, for example, in step 350.

In step 360, the computing device may send a response to the user device. The response may include an indication that the enrollment request is approved. Additionally or alternatively, the response may comprise an indication of the authentication credentials to use when access the application gateway. In further examples, the response may include one or more configuration settings. A first configuration setting, of the one or more configuration settings, may configure the web browser on the user device to use a gateway (e.g., application gateway 140) as a proxy server for requests to access one or more applications.

Figure 4:
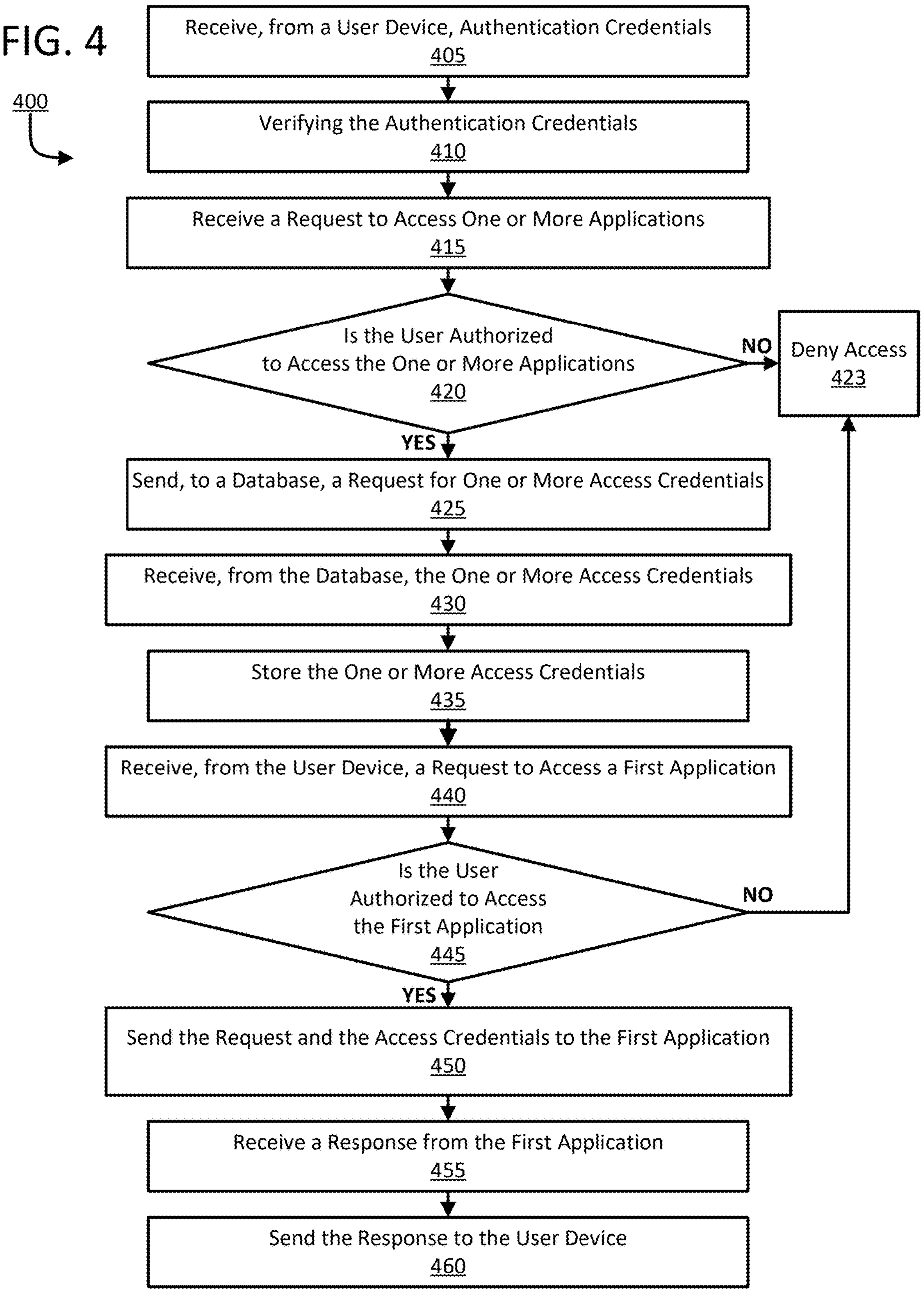
FIG. 4 shows an example of a process for accessing one or more applications in accordance with one or more aspects of the disclosure.

After a role has been provisioned for a user, the user may use the role to access one or more web applications. FIG. 4 shows an example of a process for accessing one or more applications in accordance with one or more aspects of the disclosure. Some or all of the steps of the process shown in FIG. 4 may be performed using one or more computing devices as described herein, including, for example, user device 110, SSO server 120, ILM server 130, audit server 150, application gateway 140, one or more applications 160, or any combination thereof.

In step 405, a computing device (e.g., application gateway 140) may receive authentication credentials. As noted above, the authentication credentials may be a username and password, biometric credentials, multifactor authentication, or the like. In step 410, the computing device may verify the authentication credentials. In some examples, the authentication credentials may comprise single sign-on credentials. Additionally or alternatively, authenticating the credentials may comprise comparing the received authentication credentials to previously stored authentication credentials. In some instances, the computing device may communicate with SSO server 120 to verify the received authentication credentials. When the received authentication credentials do not match previously stored authentication credentials, access may be denied. However, when the received authentication credentials match previously stored authentication credentials, the user may be verified by the computing device.

After verification of the authentication credentials, the computing device may receive a request to access one or more applications, in step 415. The one or more application may be one or more web-based applications, and in particular, legacy web-based application. In some instances, the request to access the one or more applications may comprise user identification information. The user identification information may be added by a browser cookie.

In step 420, the computing device may determine whether the user is authorized to access the one or more applications. The determination as to whether the user is authorized to access the one or more applications may be based on the user identification information included in the request. In this regard, the computing device may use the user identification information to identify the user's entitlements, privileges, and/or rights. Based on the identify the user's entitlements, privileges, and/or rights, the computing device may determine whether the user has permission to access the one or more applications. If the user does not have permission to access the one or more applications, then the computing device may send a response to the user device, in step 423. The response may indicate that the user is not authorized to access the one or more applications. However, when the user does have permissions to access the one or more application, the computing device may provision one or more access credentials so that the user device may access the one or more applications. As noted above, the one or more access credentials may be shared by a plurality of user devices.

In order to provision the one or more access credentials, the computing device may send a request for the one or more access credentials to a database (e.g., database 145), in step 425. In step 430, the computing device may receive, from the database, the one or more access credentials on behalf of the user device. In step 435, the computing device may store the one or more access credentials for the user device.

In step 440, the computing device may receive a request to access an application. As noted above, the application may be a web-based application of a plurality of available web-based applications. Additionally or alternatively, the application may comprise a legacy web application, a productivity application, or a webpage. In some instances, the request to access the application may comprise a request to access one or more fields of a webpage or a particular field of the application. As noted above, access credentials may never be exposed to end-users. Accordingly, the access credentials may be maintained in confidence by application gateway 140 after being retrieved from the secure database (e.g., database 145).

In step 445, the computing device may determine whether the request to access the application complies with one or more entitlements. In this regard, the computing device may retrieve the user's entitlements, privileges, and/or rights, for example, from a database (e.g., database 145). The computing device may compare the request to the user's entitlements, privileges, and/or rights to determine whether the user has permission to access the application. If the user does not have permission to make the request, the computing device may send a response to the user device, in step 423, indicating that the request is not authorized. However, when the computing device determines that the request is permitted, the process may proceed to step 450.

In step 450, the computing device may send the request and the one or more access credentials to the application. In this regard, the computing device may automatically enter the one or more access credentials via a login screen of the application, for example, if this is the first time that the user is accessing the application. Subsequent access attempts may include user identification information that may be used to determine whether the user has permission to access the application. In step 455, the computing device may receive a response to the request from the application. In this regard, the computing device may verify that the user is permitted to receive the response. In this regard, the computing device may compare the response to the user's entitlements, privileges, and/or roles to determine whether the user is permitted to receive the response. When the response does not comply, the computing device may redact information from the response that the user is not entitled to receive. Alternatively, the computing device may block the response. That is, the computing device may not send the response to the user device. However, when the response complies with the user's entitlements, privileges, and/or rights, the computing device may send the response to the user device.

By using the techniques described above, all traffic may pass through the gateway. The gateway may improve security by ensuring users have access to application and further monitoring of interactions between user devices and web-based applications. In some instances, security may be further enhanced by the computing device storing interactions between the user devices and the applications in an audit log. That is, an audit log may store a plurality of access requests made by a plurality of user devices and the responses associated therewith. The audit log may also record access attempts (e.g., failed login attempts), as well as all other interactions between the user devices and the web-based applications. The audit log may be used as part of a security audit. As noted above, each record in the audit log may include an indication of who is performing the action, what the action is, which resource it is being performed on, and the response status (e.g., allowed or denied). The data collected may be used to ensure that proper access control is being enforced. The collected data may also be used to identify non-compliant applications, role violations, etc. The audit log may be used to generate reports as part of an annual security audit, which may assist in identifying and resolving potential segregation of duties (SOD) violations and help improve the overall security of the enterprise network.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) Python, Perl, or any equivalent thereof. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

The invention claimed is:

1. A method comprising:

receiving, by a gateway from a user device, authentication credentials;

verifying, by the gateway, the authentication credentials;

receiving, by the gateway and based on verification of the authentication credentials, a request to access one or more web-based applications, wherein the request comprises user identification information;

determining, based on the user identification information, whether the user device is authorized to access the one or more web-based applications;

based on a determination that the user device is authorized to access the one or more web-based applications, provisioning, by the gateway to the user device, one or more access credentials for accessing the one or more web-based applications, wherein the one or more access credentials are configured to be shared by a plurality of user devices;

receiving, by the gateway from the user device, a request to access a web-based application of the one or more web-based applications;

determining, by the gateway, whether the request to access the web-based application complies with one or more entitlements;

based on a determination that the request to access the web-based application complies with the one or more entitlements, sending, to the web-based application, the request and the one or more access credentials;

receiving, by the gateway and based on the web-based application verifying the one or more access credentials, a response to the request; and sending, by the gateway to the user device, the response to the request.

2. The method of claim 1, wherein the provisioning the one or more access credentials to the user device comprises:

sending, by the gateway to a vault, a request for the one or more access credentials; and receiving, by the gateway from the vault, the one or more access credentials.

3. The method of claim 2, further comprising:

storing, by the gateway on behalf of the user device, the one or more access credentials.

4. The method of claim 1, further comprising:

receiving, by the gateway from the user device, a second request to access a second web-based application;

determining, based on the one or more access credentials, whether the user device is authorized to access the second web-based application; and based on a determination that the second request to access the second web-based application is not authorized, sending, to the user device, a response indicating that the second request is not authorized.

5. The method of claim 4, further comprising:

storing, by the gateway, the second request in an audit log, wherein the audit log comprises a plurality of access requests by each user device.

6. The method of claim 1, further comprising:

receiving, by the gateway from the user device, a second request to access the web-based application;

determining, by the gateway, whether the second request to access the web-based application complies with the one or more entitlements; and based on a determination that the second request to access the web-based application does not comply with the one or more entitlements, sending, to the user device, a response indicating that the second request is not authorized.

7. The method of claim 6, wherein the second request comprises a request to access a particular field of the web-based application.

8. The method of claim 1, further comprising:

sending, to the user device, one or more configuration settings, wherein a first configuration setting, of the one or more configuration settings, configures the gateway as a proxy server for the user device.

9. The method of claim 1, wherein the web-based application comprises at least one of:

a legacy web application;

a productivity application; or a webpage.

10. The method of claim 1, wherein the request to access the web-based application comprises a request to access one or more fields of a webpage.

11. The method of claim 1, further comprising:

receiving, by the gateway from the user device, a request to register with the gateway;

creating, by the gateway, an account for the user device, wherein the account comprises the authentication credentials and the one or more entitlements; and sending, by the gateway to the user device and in response to the request to register with the gateway, the authentication credentials.

12. An access gateway comprising:

one or more processors; and memory storing instructions that, when executed by the one or more processors, cause the access gateway to:

receive, from a user device, a request to access one or more web-based applications, wherein the request comprises user identification information;

determine, based on the user identification information, whether the user device is authorized to access the one or more web-based applications;

based on a determination that the user device is authorized to access the one or more web-based applications, send, to a vault, a request for one or more access credentials for accessing the one or more web-based applications;

receive, from the vault, the one or more access credentials, wherein the one or more access credentials are configured to be shared by a plurality of user devices;

storing, on behalf of the user device, the one or more access credentials;

receive, from the user device, a request to access a web-based application of the one or more web-based applications;

determine whether the request to access the web-based application complies with one or more entitlements;

based on a determination that the request to access the web-based application complies with the one or more entitlements, send, to the web-based application, the request and the one or more access credentials;

receive, based on the web-based application verifying the one or more access credentials, a response to the request; and send, to the user device, the response to the request.

13. The access gateway of claim 12, wherein the instructions, when executed by the one or more processors, cause the access gateway to:

receive, from the user device, a second request to access a second web-based application;

determine, based on the one or more access credentials, whether the user device is authorized to access the second web-based application; and based on a determination that the second request to access the second web-based application is not authorized, send, to the user device, a response indicating that the second request is not authorized.

14. The access gateway of claim 13, wherein the instructions, when executed by the one or more processors, cause the access gateway to store the second request in an audit log, wherein the audit log comprises a plurality of access requests by each user device.

15. The access gateway of claim 12, wherein the instructions, when executed by the one or more processors, cause the access gateway to:

receive, from the user device, a second request to access the web-based application;

determine whether the second request to access the web-based application complies with the one or more entitlements; and based on a determination that the second request to access the web-based application does not comply with the one or more entitlements, send, to the user device, a response indicating that the second request is not authorized.

16. The access gateway of claim 12, wherein the instructions, when executed by the one or more processors, cause the access gateway to:

send, to the user device, one or more configuration settings, wherein a first configuration setting, of the one or more configuration settings, configures the access gateway as a proxy server for the user device.

17. A non-transitory computer-readable medium storing instructions that, when executed, cause an access gateway to:

receive, from a user device, a request to access one or more web-based applications, wherein the request comprises user identification information;

determine, based on the user identification information, whether the user device is authorized to access the one or more web-based applications;

based on a determination that the user device is authorized to access the one or more web-based applications, send, to a vault, a request for one or more access credentials for accessing the one or more web-based applications;

receive, from the vault, the one or more access credentials, wherein the one or more access credentials are configured to be shared by a plurality of user devices;

storing, on behalf of the user device, the one or more access credentials for accessing the one or more web-based applications;

receive, from the user device, a request to access a web-based application of the one or more web-based applications;

determine whether the request to access the web-based application complies with one or more entitlements; and based on a determination that the request to access the web-based application does not comply with the one or more entitlements, send, to the user device, a response indicating that the request is not authorized.

18. The non-transitory computer-readable medium of claim 17, wherein the web-based application comprises at least one of:

a legacy web application;

a productivity application; or a webpage.

19. The non-transitory computer-readable medium of claim 17, wherein the request to access the web-based application comprises a request to access one or more fields of a webpage.

20. The non-transitory computer-readable medium of claim 17, wherein the instructions, when executed, cause the access gateway to:

receive, from the user device, a request to register with the gateway;

create an account for the user device, wherein the account comprises one or more authentication credentials and the one or more entitlements; and send, to the user device and in response to the request to register with the gateway, the one or more authentication credentials.

* * * * *